United States Patent
Hou et al.

(10) Patent No.: US 10,040,718 B2
(45) Date of Patent: Aug. 7, 2018

(54) METHODS TO TEXTURE OPAQUE, COLORED AND TRANSLUCENT MATERIALS

(71) Applicant: CORNING INCORPORATED, Corning, NY (US)

(72) Inventors: Jun Hou, Painted Post, NY (US); Yuhui Jin, Painted Post, NY (US); Lu Zhang, Taipei (TW)

(73) Assignee: Corning Incorporated, Corning, NY (US)

( * ) Notice: Subject to any disclaimer, the term of this patent is extended or adjusted under 35 U.S.C. 154(b) by 367 days.

(21) Appl. No.: 14/438,755

(22) PCT Filed: Oct. 30, 2013

(86) PCT No.: PCT/US2013/067472
§ 371 (c)(1),
(2) Date: Apr. 27, 2015

(87) PCT Pub. No.: WO2014/070869
PCT Pub. Date: May 8, 2014

(65) Prior Publication Data
US 2015/0299034 A1    Oct. 22, 2015

Related U.S. Application Data

(60) Provisional application No. 61/721,797, filed on Nov. 2, 2012.

(51) Int. Cl.
*C03C 15/00* (2006.01)
*G02F 1/1335* (2006.01)
(Continued)

(52) U.S. Cl.
CPC .............. *C03C 15/00* (2013.01); *B44C 1/227* (2013.01); *C03C 10/0018* (2013.01);
(Continued)

(58) Field of Classification Search
None
See application file for complete search history.

(56) References Cited

U.S. PATENT DOCUMENTS

| 3,812,689 A | 5/1974 | Reade | 65/33 |
| 4,074,992 A | 2/1978 | Voss | 65/30 |

(Continued)

FOREIGN PATENT DOCUMENTS

| JP | 11120554 A | 4/1999 |
| JP | 2003002685 A | 1/2003 |

(Continued)

OTHER PUBLICATIONS

TW102139820 Search Report dated Jan. 5, 2017, Taiwan Patent Office.

(Continued)

*Primary Examiner* — Jiong-Ping Lu
(74) *Attorney, Agent, or Firm* — Payal A. Patel; Jeffrey A. Schmidt

(57) ABSTRACT

Methods of modifying glass-ceramic articles and glass-ceramic articles formed therefrom. The methods include providing a glass-ceramic article having a non-damaged surface, applying a chemical etching solution to the non-damaged surface, and removing the chemical etching solution. The chemical etching solution modifies the non-damaged surface so that from about 0.01 µm to about 2 µm of a depth of the glass-ceramic article is removed. The chemical etching solution modifies the non-damage surface of the glass-ceramic article to form a roughened surface having a reduced gloss value and a target roughness value.

18 Claims, 9 Drawing Sheets

(51) Int. Cl.
  *C09K 13/04* (2006.01)
  *B44C 1/22* (2006.01)
  *C03C 10/00* (2006.01)
  *C09K 13/08* (2006.01)

(52) U.S. Cl.
  CPC .............. *C09K 13/04* (2013.01); *C09K 13/08* (2013.01); *G02F 1/133502* (2013.01)

(56) References Cited

U.S. PATENT DOCUMENTS

| | | | |
|---|---|---|---|
| 4,683,168 A | 7/1987 | Hares et al. .................. 428/335 |
| 4,833,001 A | 5/1989 | Kijima et al. |
| 4,977,110 A | 12/1990 | Amundson, Jr. et al. ......... 501/7 |
| 5,176,961 A | 1/1993 | Cooker et al. ................ 428/409 |
| 5,491,115 A | 2/1996 | Pfitzenmaier et al. ........... 501/4 |
| 6,183,892 B1 * | 2/2001 | Saiki .................. G11L 35/7315 428/433 |
| 6,337,029 B1 | 1/2002 | Hardy et al. |
| 6,936,555 B2 | 8/2005 | Pinckney ........................ 501/10 |
| 7,199,066 B2 | 4/2007 | Horsfall et al. ................ 501/67 |
| 7,465,687 B2 | 12/2008 | Beall ................................ 501/9 |
| 8,062,732 B2 | 11/2011 | Sabia et al. ................... 428/149 |
| 8,425,802 B2 | 4/2013 | Fujita et al. |
| 8,771,532 B2 | 7/2014 | Carlson et al. |
| 8,992,786 B2 | 3/2015 | Kohli et al. |
| 9,085,484 B2 | 7/2015 | Guilfoyle et al. |
| 2003/0160026 A1 * | 8/2003 | Klein ...................... C03C 15/00 216/83 |
| 2003/0170459 A1 | 9/2003 | Lin ................................ 428/410 |
| 2011/0317257 A1 | 12/2011 | Rendon Granados ........ 359/350 |
| 2012/0134025 A1 | 5/2012 | Hart ................................ 359/601 |
| 2013/0136909 A1 | 5/2013 | Mauro et al. .................. 428/220 |

FOREIGN PATENT DOCUMENTS

| | | | |
|---|---|---|---|
| JP | 2003229048 A | 8/2003 | |
| JP | 2007170754 A | 7/2007 | |
| JP | 2009149468 A | 7/2009 | |
| WO | 2010/117673 | 10/2010 | ............ C03C 15/00 |
| WO | 2012/074811 | 6/2012 | ............ C03C 15/00 |
| WO | 2012/075068 A2 | 6/2012 | ............ C03C 3/093 |
| WO | 2012/075068 A3 | 6/2012 | ............ C03C 3/093 |

OTHER PUBLICATIONS

Patent Cooperation Treaty International Notification of Transmittal of the International Search Report and The Written Opinion of the International Searching Authority, international application No. PCT/US2013/067472: dated Feb. 7, 2014, 8 pages.

English Translation of JP2015540745 Office Action dated Sep. 26, 2017, Japan Patent Office.

* cited by examiner

METHODS TO TEXTURE OPAQUE, COLORED AND TRANSLUCENT MATERIALS

This application claims the benefit of priority under 35 U.S.C. § 119 of U.S. Provisional Application Ser. No. 61/721,797 filed on Nov. 2, 2012 the content of which is relied upon and incorporated herein by reference in its entirety.

BACKGROUND

Field

The present disclosure relates to methods of modifying a glass-ceramic article, and more particularly, relates to methods of modifying a non-damaged surface of a glass-ceramic article by applying a chemical etching solution thereto.

Technical Background

The use of glass ceramics in electronic devices is becoming increasingly popular. The use of glass and glass ceramics in electronic devices provides optical properties and surface textures which significantly influence the functionality, touch feeling, and appearance of such devices. In particular, the surface appearance (e.g., gloss value, surface roughness, and anti-glare properties) of glass and glass ceramics has become important in recent years to meet consumer demands.

In order to reduce the glare and/or reflection from the ambient environment on the surface of glass ceramics during the usage, and also to provide smooth tactile feel, several methods may be employed which include: 1) providing an anti-reflection (hereinafter "AR") coating; and 2) providing an anti-glare (hereinafter "AG") treatment. AR coatings reduce the refractive index difference between the surface of the glass ceramic and the ambient environment. AG treatment, through roughening of the surface of the glass ceramic, causes the reflection to be scattered into different direction. Typically, to achieve similar performance, AR coatings are more expensive than AG treatment. Additionally, AR coatings are generally smooth, which does not change the tactile response from un-treated surfaces. Surface glare of glass ceramics may also be reduced by roughening of such surfaces, which may be achieved by the following methods: 1) coating; 2) sand blasting; and 3) chemically etching the surface of the glass ceramic. For AG coating, the surface is coated with organic or non-organic droplets or particles. While such coatings can provide scattering properties, they are not normally very durable to scratch.

Currently, in order to reduce the gloss of glass ceramics via roughening, surfaces of glass ceramics are first treated by physically damaging of the surfaces (e.g., sand blasting), followed by chemically etching the surfaces with HF. Physically damaging the surfaces is employed to generate a rough and/or damaged glass ceramic surface, and chemically etching is employed to polish and strengthen the rough and/or damaged glass ceramic surface. The combined processes may produce a glass ceramic surface with gloss values of from 30% to 90%, and with roughness (i.e. Ra) from 0.1 to 20 µm.

However, these processes include several limitations and drawbacks, such as: 1) by requiring two-steps, the process is unable to adjust surface gloss without physically damaging the surface of the glass ceramics and chemical etching is employed only for polishing and strengthening purposes (and not for gloss manipulation); 2) the processes are unable to precisely control the surface properties of the surface of the glass ceramics, such as surface roughness and gloss; and 3) the physical damage to the surface of the glass ceramics caused by sand blasting permanently damages the glass ceramic surface, and significantly reduces the strength of the base material, and the chemical etching treatment may not be able to fully recover such lost strength.

Accordingly, ongoing needs exist for alternative methods for modifying the surface appearance and the touch and feel of glass ceramics.

SUMMARY

In one embodiment, a method of modifying a non-damaged surface of a glass-ceramic article is disclosed. The method includes providing a glass-ceramic article having a non-damaged surface and an initial gloss value, applying a chemical etching solution to the non-damaged surface of the glass-ceramic article for an etching time of about 5 s to less than 15 min, and removing the chemical etching solution. The chemical etching solution is formed by mixing hydrofluoric acid and an inorganic fluoride salt. The chemical etching solution modifies the non-damaged surface such that from about 0.01 µm to about 20 µm of a depth of the glass-ceramic article is removed. Additionally, the chemical etching solution modifies the non-damaged surface of the glass-ceramic article to form a roughened surface having a reduced gloss value and a target roughness value. The chemical etching solution is subsequently removed from the roughened surface.

In another embodiment, a method of modifying a non-damaged surface of a glass-ceramic article having a major amorphous phase is disclosed. The method includes providing a glass-ceramic article having a non-damaged surface and an initial gloss value, applying a chemical etching solution to the non-damaged surface of the glass-ceramic article for an etching time of about 5 s to less than 15 min, and removing the chemical etching solution from the roughened surface. The chemical etching solution is formed by mixing hydrofluoric acid and an ammonium fluoride salt. The chemical etching solution modifies the non-damaged surface such that from about 0.01 µm to about 20 µm of a depth of the glass-ceramic article is removed. The chemical etching solution also modifies the non-damaged surface of the glass-ceramic article to form a roughened surface having a reduced gloss value of from about 1% to about 30% at 60° and a target roughness value of from about 150 RMS (nm) to about 800 RMS (nm).

In yet another embodiment, a method of modifying a non-damaged surface of a glass-ceramic article having a major crystalline phase is disclosed. The method includes providing a glass-ceramic article having a non-damaged surface and an initial gloss value, applying a chemical etching solution to the non-damaged surface of the glass-ceramic article for an etching time of about 5 s to less than 15 min, and removing the chemical etching solution from the roughened surface. The chemical etching solution includes hydrofluoric acid. The chemical etching solution modifies the non-damaged surface such that from about 0.01 µm to about 20 µm of a depth of the glass-ceramic article is removed. The chemical etching solution also modifies the non-damaged surface of the glass-ceramic article to form a roughened surface having a reduced gloss value and a target roughness value.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
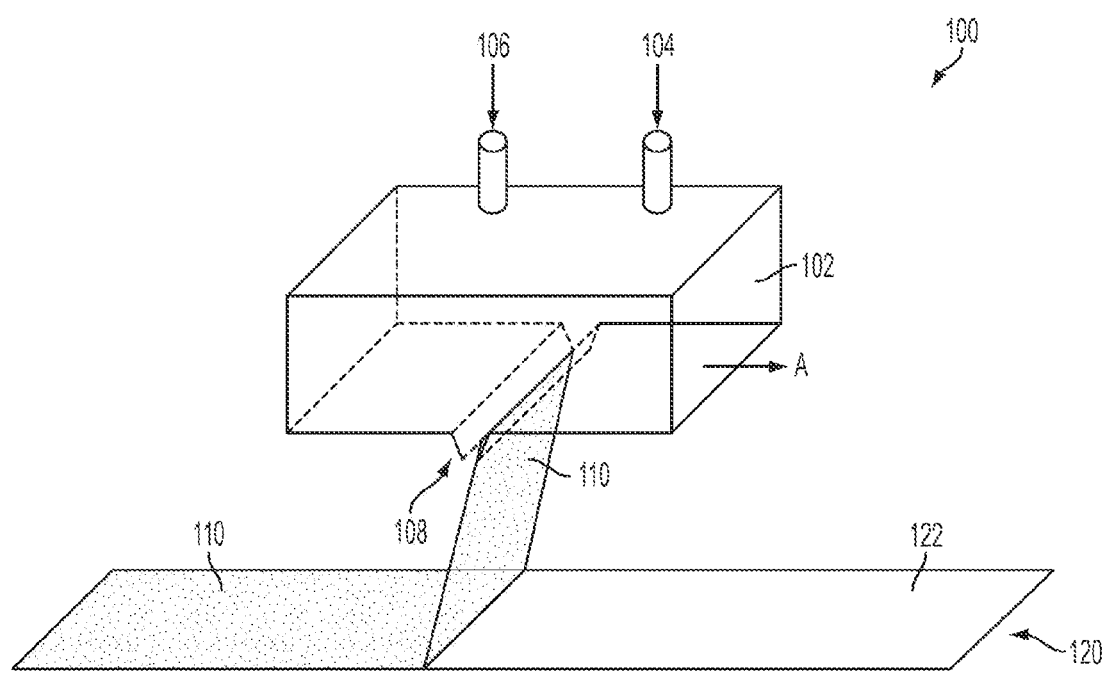
FIG. 1 is a perspective view of a curtain coating applicator for applying an acid film to a surface of a glass-ceramic substrate.

Embodiments of the present disclosure relate to methods of modifying a non-damaged surface of a glass-ceramic article. In one embodiment, the method includes providing a glass-ceramic article having a non-damaged surface and an initial gloss value, applying a chemical etching solution to the non-damaged surface of the glass-ceramic article for an etching time of about 5 s to less than 15 min to form a roughened surface, and removing the chemical etching solution from the roughened surface. Reference will now be made in detail to such methods. More particularly, embodiments of providing a glass-ceramic article having a non-damaged surface and an initial gloss value will be described in detail. Thereafter, embodiments of applying a chemical etching solution to the non-damaged surface and of removing the chemical etching solution from the roughened surface will be described.

I. Providing a Glass-Ceramic Article

Embodiments of providing a glass-ceramic article are disclosed. As set forth in U.S. Pat. No. 5,491,115, the contents of which are hereby incorporated by reference in their entirety, a glass-ceramic is a material having at least one crystalline phase thermally developed in a substantially uniform pattern throughout at least a portion of a glass precursor. In addition to having at least one crystalline phase, glass-ceramics also have an amorphous phase. Glass-ceramics find application in a variety of areas, including the fabrication of articles employed in the preparation and serving of food and also in electronic devices. Glass-ceramic materials are generally produced by: 1) melting a mixture of raw materials, generally including a nucleating agent, to produce a glass; 2) forming an article from the glass and cooling the glass below its transformation range; and 3) crystallizing (i.e., "ceramming") the glass article by an appropriate treatment. Glass-ceramics provide an array of materials possessing a variety of properties such as zero porosity, high strength, translucency, toughness, opacity, pigmentation, and opalescence. Such properties may be provided by choice of base glass composition and control of the heat treatment and crystallization of the base glass. Examples of suitable glass-ceramic articles include those formed from the following glass-ceramic systems: 1) $Li_2O$—$Al_2O_3$—$SiO_2$ System (i.e., LAS-System); 2) MgO—$Al_2O_3$—$SiO_2$ System (i.e., MAS-System); and 3) ZnO—$Al_2O_3$—$SiO_2$ System (i.e., ZAS-System).

Examples of suitable transparent, translucent, or opaque glass-ceramic articles include LAS-System glass-ceramic articles, i.e. lithium alumino silicate glass-ceramic articles. As set forth in U.S. Pat. No. 5,491,115, the LAS-System may generally provide highly crystallized glass-ceramics which include a predominant crystalline phase of: 1) a transparent beta-quartz solid solution; or 2) an opaque beta-spodumene solution (dependent upon the ceramming temperature). The appearance of such LAS-System glass-ceramics may be varied by varying ceramming conditions, e.g., heat treatment. Accordingly, transparent, translucent, or opaque glass-ceramics (which may be water-white, translucent, opaque, white, or variously colored) may be achieved. More particularly, as set forth in U.S. Pat. No. 5,491,115, transparent glass-ceramics in the LAS-System may be achieved by ceramming precursor glass at a relatively low temperature which does not normally exceed about 900° C. Moreover, ceramming the same glass at a higher temperature of about 1150° C. may produce an opaque beta-spodumene crystalline phase. At such a high temperature, small beta-quartz crystals may convert to beta-spodumene crystals and grow in size, thereby rendering the product opaque.

Additional examples of suitable translucent or opaque lithium alumino silicate glass-ceramic articles are set forth in International Publication No. WO 2012/075068, the contents of which are hereby incorporated by reference in their entirety. As set forth in International Publication No. WO 2012/075068, the translucent or opaque silicate crystal-containing glass-ceramics include, in weight percent on an oxide basis, 40-80% $SiO_2$, 2-30% $Al_2O_3$, 2-30% $Al_2O_3$, 2-10% $Li_2O$, 0-8% $TiO_2$, 0-3% ZrO, 0-2% $SnO_2$, 0-7%

BrO$_3$, 0-4% MgO, 0-12% ZnO, 0-8% BaO, 0-3% CaO, 0-6% SrO, 0-4% K$_2$O, up to 2% Na$_2$O, 0-1.0% Sb$_2$O$_3$, 0-0.25% Ag, 0-0.25% CeC$_2$, the combination of Li$_e$+Na$_2$O/Al$_2$O$_3$+B$_2$O$_3$ in amount of greater than 0.8 mol %, and the combination of TiO$_2$+ZrO$_2$+SnO$_2$ in an amount of at least 3.0 mol %. Such silicate crystal-containing glass-ceramics may be generally formed by: a) melting a batch for, and down drawing a glass article having a composition including, in weight percent on an oxide basis, of 40-80% SiO$_2$, 2-30% Al$_2$O$_3$, 5-30% Na$_2$O, 0-8% TiO$_2$, 0-12% ZrO, 0-2% SnO$_2$, 0-7% B$_2$O$_3$, 0-4% MgO, 0-6% ZnO, 0-8% BaO, 0-3% CaO, 0-6% SrO, 0-4% K$_2$O, 0-2% Li$_2$O, 0-1.0% Sb$_2$O$_3$, 0-0.25% Ag, 0-0.25% CeO$_2$, the combination of Na$_2$O/Al$_2$O$_3$+B$_2$O$_3$ in an amount of greater than 0.8 mol %, and the combination of TiO$_2$+ZrO$_2$+SnO$_2$ in an amount of at least 3.0 mol %; b) ion exchanging the glass article by placing the glass article in a Li-containing salt bath exhibiting a temperature sufficiently above the glass strain point and holding the glass sheet for time sufficient to complete ion exchange of Li for Na ions substantially throughout the glass article; c) ceramming the glass to a temperature between about 550-1100° C. for a period of time sufficient to cause the generation of a glass-ceramic which contains a predominant silicate crystalline phase of lithium alumino silicate (beta-spodumene and/or beta-quartz solid solution), lithium metasilicate and/or lithium disilicate phase and exhibits a glass-ceramic composition within the SiO$_2$—R$_2$O$_3$—Li$_2$O/Na$_2$O—TiO$_2$ system, and; d) cooling the glass-ceramic article to room temperature.

Also set forth in International Publication No. WO 2012/075068, an opaque glass-ceramic article glass-ceramic article having a predominant spodumene crystalline phase and a minor rutile crystalline phase is disclosed. Such opaque glass-ceramic articles may be formed from a precursor glass from the basic SiO$_2$—Al$_2$O$_3$—Na$_2$O system. More particularly, a simple sodium alumino silicate glass with the following batched composition, in weight percent, may be produced: 58.8% SiO$_2$, 21.5% Al$_2$O$_3$, 13.6% Na$_2$O, 0.3% SnO$_2$, and 4.3% TiO$_2$. This glass may be batched, mixed, and melted in a platinum crucible at 1650° C. and thereafter annealed at 650° C. This glass may then be cut, polished, and placed in a molten salt bath of a composition having 75 wt. % Li$_2$SO$_4$ and 25 wt. % Na$_2$SO$_4$ and held for two hours at a temperature of 800° C. This time and temperature may be sufficient to allow Li$^+$ and Na$^+$ ion exchange and to allow internal nucleation and crystallization to occur over the whole thickness of the glass, i.e., ion-exchange and ceramming may occur simultaneously in the molten salt bath. The resultant glass-ceramic article may be a white glass-ceramic exhibiting a glossy skin. Additionally, such white glass-ceramic articles may include lithium aluminosilicate as the predominant crystalline phase. More particularly, such white glass-ceramic articles may include beta-spodumene as the predominant crystalline phase, rutile as the minor crystalline phase, and amorphous phases.

Additionally, as set forth in U.S. Publication No. 2013/0136909, Corning® Gorilla® Glass (Corning Incorporated, Corning, N.Y.), is an example of an alkali aluminosilicate glass. Such publication also discloses a method of making colored glass articles from aluminosilicate glass articles. The contents of U.S. Publication No. 2013/0136909 are hereby incorporated by reference in their entirety.

Additional examples of suitable glass-ceramic articles include MAS-System glass-ceramic articles, i.e., magnesium aluminum silicate glass-ceramic articles. As set forth in U.S. Pat. No. 7,465,687, the contents of which are hereby incorporated by reference in their entirety, the MAS-System may generally provide glass-ceramic articles having a predominant crystalline phase of cordierite. Such glass-ceramic articles may also include minor crystalline phases of: 1) an acicular crystalline phase such as titanates, including e.g., magnesium titanates, aluminum titanates and combinations thereof; and/or 2) ceramic compounds capable of lamellar twinning, including e.g., enstatite, and/or anorthite. In one or more embodiments, such glass-ceramic articles may include from 50-80 volume % cordierite, from 8-20 volume % of an acicular minor phase, and up to 20 volume % of ceramic compounds capable of lamellar twinning. In additional embodiments, the glass-ceramic article may be formed from a composition having, in weight %, 35-50% SiO2, 10-35% Al2O3, 10-25% MgO, 7-20% TiO2, up to 5% CaO, and up to 10% SrO, and up to 5% F, where CaO+SrO is at least 0.5%.

Further examples of suitable glass-ceramic articles include ZAS-System glass-ceramic articles, i.e., zinc oxide alumino silicate glass-ceramic articles. As set forth in U.S. Pat. No. 6,936,555, the contents of which are hereby incorporated by reference in their entirety, the ZAS-System may generally provide transparent glass-ceramic articles exhibiting a predominant crystalline phase of hexagonal ZnO crystals. In one or more embodiments, such glass-ceramic articles may include at least 15%, by weight, of hexagonal ZnO crystals. In additional embodiments, such glass-ceramic articles may include a total crystallinity ranging from 15-35% of ZnO crystals. In another embodiment, the glass-ceramic article may be formed from a composition including, in weight percent, 25-50% SiO$_2$, 0-26% Al$_2$O$_3$, 15-45% ZnO, 0-25% K$_2$O, 0-10% Na$_2$O, 0-32% Ga$_2$O$_3$, K$_2$O+Na$_2$O>10%, and Al$_2$O$_3$+Ga$_2$O$_3$>10%.

In some embodiments, the glass-ceramic article is transparent, translucent, or opaque. In one particular embodiment, the glass-ceramic article is white. In another particular embodiment, the glass-ceramic article is black. In other embodiments, the glass-ceramic article is a lithium alumino silicate glass-ceramic article, a magnesium aluminum silicate glass-ceramic article, or a zinc oxide alumino silicate glass-ceramic article.

In some embodiments, the glass-ceramic article has a major crystalline phase. As used herein, the term "major crystalline phase" refers to a glass-ceramic having greater than or equal to 30% by volume crystallinity. In one particular embodiment, the glass-ceramic article has about 90% by volume crystallinity. Alternatively, in other embodiments, the glass-ceramic article has a major amorphous phase. As used herein, the terms "major amorphous phase" or "major glass phase" are used interchangeably to refer to a glass-ceramic having less than 30% by volume crystallinity. In one particular embodiment, the glass-ceramic article has about 95% by volume amorphous phase.

In some embodiments, the glass-ceramic article has a non-damaged surface. However, the glass-ceramic article may also include two or more non-damaged surfaces. As used herein, the terms "non-damaged surface" and "non-damaged surfaces" refer to a surface or surfaces of a glass-ceramic article which have not been subject to physical damage (e.g., sand blasting). Such physical damage to a surface or surfaces of a glass-ceramic article decreases the strength of the glass-ceramic article. Accordingly, glass-ceramic articles which have been subject to physical damage exhibit a reduction in strength relative to those glass-ceramic articles which have not been subject to physical damage. In some embodiments, the glass-ceramic article has not been subject to physical damage. In further embodiments, the glass-ceramic article exhibits no reduction in strength. More particularly, in some embodiments, formation of the roughened surface on the glass-ceramic article having a reduced gloss value and a target roughness value preserves and/or improves surface strength of the glass-ceramic article.

In some embodiments, the glass-ceramic article has an initial gloss value. As used herein, the terms, "common gloss" and "gloss" refer to the measurement of specular reflectance calibrated to a standard (such as, for example, a certified black glass standard), such as in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Additionally, as used herein, the term "initial gloss value" refers to a gloss value which is taken prior to treatment with a chemical etching solution. For example, in the context of a glass-ceramic article, the initial gloss value may be from about 80% to about 100%, or from about 85% to about 95%, or about 90% at 60°.

II. Applying a Chemical Etching Solution to the Non-Damaged Surface

Embodiments of applying a chemical etching solution to the non-damaged surface of the glass-ceramic article are disclosed. The uniqueness of glass-ceramics in having both a crystalline phase and an amorphous phase allows for differential etching and/or differential modification of the respective phases with chemical etchants, e.g., chemical etching solutions. Differential etching refers to the ability of the crystalline phase and the amorphous phase of glass-ceramic articles to be etched and/or modified at different rates by the same chemical etchants and/or chemical etching solutions. With regard to chemical etching solutions suitable for both glass-ceramic articles having a major crystalline phase and glass-ceramic articles having a major amorphous phase, in some embodiments, the chemical etching solution is formed by mixing hydrofluoric acid (i.e., HF) and an inorganic fluoride salt (i.e., an inorganic cation, $X^+$ and $F^-$).

With regard to hydrofluoric acid, the chemical etching solution may include from about 0.2% (w/w) to about 10% (w/w) hydrofluoric acid, or from about 0.5% (w/w) to about 6% (w/w) hydrofluoric acid, or alternatively from about 1% (w/w) to about 5% (w/w) hydrofluoric acid, or alternatively from about 3% (w/w) to about 4% (w/w) hydrofluoric acid. Stated another way, the chemical etching solution may include hydrofluoric acid having a concentration of from about 0.5 M to about 1.5 M, or from about 0.75 M to about 1 M, or about 1 M. With regard to inorganic fluoride salts, the chemical etching solution may include from about 1% (w/w) to about 30% (w/w) inorganic fluoride salt, or from about 10% (w/w) to about 25% (w/w) inorganic fluoride salt, or alternatively from about 15% (w/w) to about 20% (w/w) inorganic fluoride salt. Examples of suitable inorganic fluoride salts include ammonium fluoride (i.e., $NH_4F$), ammonium bifluoride (i.e., $NH_4F.HF$ and hereinafter "ABF"), buffered hydrofluoric acid (hereinafter "BHF"), sodium fluoride (i.e., NaF), sodium bifluoride (i.e., $NaHF_2$), potassium fluoride (i.e., KF), potassium bifluoride (i.e., $KHF_2$), and combinations thereof.

With particular regard to glass-ceramic articles having a major amorphous phase, etching behavior may be similar to that of glass articles. Accordingly, a chemical etching mask may be necessary to achieve differential etching and/or differential modification of non-damaged surfaces of glass-ceramic articles having a major amorphous phase. Such chemical etching masks may be generated in situ by applying suitable chemical etching solutions to a non-damaged surface of the glass-ceramic article having a major amorphous phase. In some embodiments, the chemical etching solution is formed by mixing hydrofluoric acid and an inorganic fluoride salt. Such chemical etching solution is as previously described. Alternatively, in other embodiments, the chemical etching solution is formed by mixing a mineral acid and an inorganic fluoride salt. The mineral acid may be employed in the absence of hydrofluoric acid to generate hydrofluoric acid and an active etching species and will be described in greater detail in a later section. The inorganic fluoride salt is as previously described.

Application of such suitable chemical etching solutions to a non-damaged surface of the glass-ceramic article having a major amorphous phase may result in the generation of an in situ mask, wherein crystals are formed on the non-damaged surface. The in situ mask or crystals may be formed upon dissolution of a portion of the glass-ceramic article by the chemical etching solution. For example, in one embodiment wherein the chemical etching solution is formed by mixing hydrofluoric acid and an inorganic fluoride salt, dissolution of the glass-ceramic article results in the formation of the anions $SiF_6^{2-}$ and $AlF_6^{3-}$, formed between fluoride ions from the chemical etching solution and elements dissolved thereby from the glass-ceramic material. Such anions may then combine with cations from the chemical etching solution, i.e., inorganic cations $X^+$ of the inorganic fluoride salt. The combination of such inorganic cations $X^-$ with the formed anions $SiF_6^{2-}$ and $AlF_6^{3-}$ results in the formation of crystals on the non-damaged surface of the glass-ceramic article. Without being bound by the theory, it is believed that the formation and/or growth of such crystals on the non-damaged surface shield a portion of the non-damaged surface while the surround surface remains exposed to the chemical etching solution. Stated another way, it is believed that the formation and/or growth of such crystals on the non-damaged surface of the glass-ceramic article prevents the glass-ceramic article underneath of such crystals from being etched and/or modified. Accordingly, differential etching may be achieved and result in a roughened and/or textured surface upon removal of such crystals. In some embodiments, wax particles may be added to the chemical etching solution to assist in formation of the in situ mask.

With particular regard to glass-ceramic articles having a major crystalline phase, differential etching may proceed automatically upon application of an appropriate chemical etching solution. Chemical etching solutions which are suitable for differentially etching glass-ceramic articles having a major amorphous phase are also suitable for differentially etching glass-ceramic articles having a major crystalline phase. Accordingly, suitable chemical etching solutions for such glass-ceramic articles having a major crystalline phase include those as previously described with regard to glass-ceramic articles having a major amorphous phase and also include additional chemical etching solutions. More particularly, in one embodiment, a chemical etching solution suitable for differential etching a glass-ceramic article having a major crystalline phase includes hydrofluoric acid without the addition of an inorganic fluoride salt. This is in contrast to suitable chemical etching solutions for glass-ceramic articles having a major amorphous phase, wherein the chemical etching solution is formed by mixing hydrofluoric acid and an inorganic fluoride salt. Stated another way, in some embodiments, chemical etching solutions suitable for differential etching of a glass-ceramic article having a major crystalline phase consist essentially of hydrofluoric acid. Such chemical etching solutions are capable of modifying a non-damaged surface of the glass-ceramic article having a major crystalline phase to form a roughened surface having a reduced gloss value and a target roughness value.

The chemical etching solutions for glass-ceramic articles having a major crystalline phase or a major amorphous phase may further include a mineral acid. In such embodiments, the chemical etching solution may be formed by mixing a mineral acid with hydrofluoric acid and optionally an inorganic fluoride salt, as previously described. The use of mineral acids in chemical etching solutions may aid the chemical etching solution in achieving a high or medium gloss value. For example, while application of the chemical etching solution to a non-damaged surface of the glass-ceramic article may result in formation, growth, and/or attachment of crystals on the non-damaged surface, the pH of the chemical etching solution may alter the formation, growth, and/or attachment of crystals to the non-damaged surface. When the pH of such a chemical etching solution is lowered due to the addition of a mineral acid, while crystals may form, grow, and/or attach to the glass-ceramic article, such crystals may be loosely tied to the non-roughened surface thereof and may not grow as deep as they would without the addition of mineral acid to the chemical etching solution. Accordingly, the addition of such mineral acids may alter the attachment of the crystals to the surface.

Generally, the addition of a mineral acid to a chemical etching solution may accelerate the etching rate. Examples of suitable mineral acids for use with the chemical etching solutions described herein include hydrochloric acid, nitric acid, phosphoric acid, sulfuric acid, boric acid, hydrofluoric acid, hydrobromic acid, perchloric acid, and combinations thereof. However, additional mineral acids known to those of skill in the art are also contemplated for use as described herein although not explicitly described. In some embodiments, the chemical etching solution may include such mineral acids having a concentration of from about 0.5 M to about 6 M, or from about 0.5 M to about 5 M, or from about 1 M to about 4 M, or from about 1.5 M to about 3 M, or from about 0.5 M to about 1 M, or from about 1 M to 2 M, or about 1 M.

The chemical etching solutions for glass-ceramic articles having a major crystalline phase or a major amorphous phase may also further include a wetting agent. In such embodiments, the chemical etching solution may be formed by mixing a wetting agent with hydrofluoric acid and optionally an inorganic fluoride salt, as previously described. Alternatively, the chemical etching solution may be formed by mixing a wetting agent with an inorganic fluoride salt and a mineral acid, as previously described. In some embodiments, the wetting agent improves etching uniformity of the chemical etching solutions. Examples of suitable wetting agents for use with the chemical etching solutions described herein include glycols (e.g., propylene glycol), glycerols (e.g., glycerol), alcohols (e.g., isopropyl alcohol), surfactants, acids (e.g., acetic acid), and combinations thereof. However, additional wetting agents known to those of skill in the art are also contemplated for use as described herein although not explicitly described. The chemical etching solution may include from about 5% (w/w) to about 25% (w/w) of a wetting agent, or alternatively from about 10% (w/w) to about 20% (w/w) of a wetting agent, or about 15% (w/w) of a wetting agent.

The chemical etching solutions for glass-ceramic articles having a major crystalline phase or a major amorphous phase may also further include a thickening agent to increase the viscosity of the chemical etching solution. In such embodiments, the chemical etching solution may be formed by mixing a thickening agent with hydrofluoric acid and optionally an inorganic fluoride salt, as previously described. Alternatively, the chemical etching solution may be formed by mixing a thickening agent with an inorganic fluoride salt and a mineral acid, as previously described. In some embodiments, the addition of thickening agents to chemical etching solutions functions to: 1) increase the viscosity of the chemical etching solution; 2) improve the handling of the chemical etching solution; 3) improve the ease of application of the chemical etching solution to the glass-ceramic article; 4) increase the safety of applying the chemical etching solution to the glass-ceramic article; and 5) improve the etching uniformity of the chemical etching solutions. Examples of suitable thickening agents for use with the chemical etching solutions described herein include polysaccharides (e.g., Xanthan gum and starch), polymers derived from cellulose (e.g., hydroxyethyl cellulose, ethyl cellulose, and methyl cellulose), polyethylene oxide polymers (e.g., polyethylene glycol), polyacrylamide, and combinations thereof. However, additional thickening agents known to those of skill in the art are also contemplated for use as described herein although not explicitly described. The chemical etching solution may include from about 0.05% (w/w) to about 5% (w/w) of a thickening agent, or alternatively from about 0.5% (w/w) to about 2% (w/w) of a thickening agent, or about 1% (w/w) of a thickening agent.

The chemical etching solutions for glass-ceramic articles having a major crystalline phase or a major amorphous phase may also further include an inert component. In such embodiments, the chemical etching solution may be formed by mixing an inert component with hydrofluoric acid and optionally an inorganic fluoride salt, as previously described. Alternatively, the chemical etching solution may be formed by mixing an inert component with an inorganic fluoride salt and a mineral acid, as previously described. In one particular embodiment wherein a chemical etching solution includes a thickening agent, addition of a thickening agent to a chemical etching solution aids in the generation of a gel, paste, and/or cream. In some embodiments, the inert component functions to aid in controlling the etching rate. Suitable examples of inert components include organic and inorganic inert components. Examples of suitable organic inert components include organic acids such as acetic acid, benzoic acid, citric acid, malonic acid, oxalic acid, and combinations thereof. Examples of suitable inorganic inert components include barium sulfate. However, additional inert components known to those of skill in the art are also contemplated for use as described herein although not explicitly described. The chemical etching solution may include from about 1% (w/w) to about 20% (w/w) of an inert component, or alternatively from about 5% (w/w) to about 15% (w/w) of an inert component, or about 10% (w/w) of an inert component.

In some embodiments, the chemical etching solution is applied to the non-damaged surface of the glass-ceramic article. Suitable examples of methods for applying the chemical etching solution to the non-damaged surface of the glass-ceramic article include spraying, curtain-coating, screen-printing, dip-coating, spin-coating, applying with a roller, rod-coating, roll-coating, and similar methods, and combinations thereof. In some embodiments, the chemical etching solution is applied to the non-damaged surface of the glass-ceramic article by dip-coating, i.e., immersing, the glass-ceramic article in the chemical etching solution.

With specific regard to chemical etching solutions having increased viscosity, e.g., chemical etching solutions which include a thickening agent and/or an inert component, application of such chemical etching solutions may be performed by curtain-coating. For example, such chemical etching solutions may be applied to the non-damaged surface of the glass-ceramic article by curtain-coating with a curtain coating applicator 100, such as is shown in FIG. 1. Such applicator includes an acid gel, paste, and/or cream reservoir 102, pressurized air inlet 104, and acid gel, paste, and/or cream inlet 106 for receiving acid gel, paste, and/or cream within the reservoir 102. The acid gel, paste, and/or cream 110 may correspond to the chemical etching solutions having increased viscosity as previously described. The acid gel, paste, and/or cream is applied through an opening 108 in the acid gel, paste, and/or cream reservoir 102 onto the non-damaged surface 122 of the glass-ceramic article 120 as the acid gel, paste, and/or cream reservoir 102 moves in a direction A.

In some embodiments, a mixture of hydrofluoric acid and a mineral acid may be applied to a non-damaged surface of the glass-ceramic article to pre-etch and/or clean the non-damaged surface prior to application of the chemical etching solution described herein. The mineral acid is as described herein. In such embodiments, the chemical etching solution is applied to the non-damaged surface of the glass-ceramic article after pre-etch and/or cleaning treatment of the non-damaged surface. In one particular embodiment, a mixture of hydrofluoric acid and a mineral acid is applied to the non-damaged surface of a glass-ceramic article prior to application and/or formation of a chemical etching mask on the glass-ceramic article having a major amorphous phase. In other embodiments, a mixture of hydrofluoric acid and a mineral acid may be applied to the roughened surface of the glass-ceramic article to fine-tune and/or optimize the morphology thereof. The mineral acid is as described herein. In such embodiments, the chemical etching solution is applied to the non-damaged surface of the glass-ceramic article before fine-tuning and/or optimization of the roughened surface.

In some embodiments, the chemical etching solution is applied to the non-damaged surface of the glass-ceramic article after the glass-ceramic article has been subjected to ion exchange. In other embodiments, the chemical etching solution is applied to the non-damaged surface of the glass-ceramic article before the glass-ceramic article has been subjected to ion exchange.

The chemical etching solution may be applied to the non-damaged surface of the glass-ceramic article for an etching time of about 5 s to less than 15 min. Alternatively, the chemical etching solution may be applied to the non-damaged surface of the glass-ceramic article for an etching time of about 15 s to about 8 min, 1 min to about 8 min, or from about 1 min to about 4 min, or from about 4 min to about 8 min, or from about 2 min to about 8 min, or from about 2 min to about 6 min, or from about 1 min to about 4 min. In one embodiment, the chemical etching solution may be applied to the non-damaged surface of the glass-ceramic article for an etching time of less than about 10 min. In another embodiment, the chemical etching solution may be applied to the non-damaged surface of the glass-ceramic article for an etching time of less than 5 min.

The chemical etching solution may modify and/or etch the non-damaged surface of the glass-ceramic article such that from about 0.01 μm to about 20 μm of a depth of the glass-ceramic article is removed (i.e., depth of removal). Alternatively, the chemical etching solution may modify the non-damaged surface of the glass-ceramic article such that from about 0.1 μm to about 10 μm, or from about 0.1 μm to about 2 μm, or from about 0.25 μm to about 1 μm, or from about 0.25 μm to about 0.75 μm, or from about 0.5 μm to about 0.75 μm of the depth of the glass-ceramic article is removed.

The chemical etching solution may also modify and/or etch the non-damaged surface of the glass-ceramic article to form a roughened surface having a reduced gloss value. As used herein, the term "reduced gloss value" refers to a measurement of specular reflectance which is calibrated to a standard, such as in accordance with ASTM procedure D523, and which is less than an initial gloss value of respective specular reflectance. For example, in the context of a glass-ceramic article, the reduced gloss value may be from about 0.04% to about 75%, or from about 0.1% to about 75%, or from about 0.1% to about 50%, or from about 0.1% to about 40%, or from about 0.1% to about 30%, or from about 1% to about 30%, or from about 10% to about 40%, or from about 20% to about 50% at 60°.

The chemical etching solution may also modify and/or etch the non-damaged surface of the glass-ceramic article to form a roughened surface having a target roughness value. As used herein, the term "target roughness value" refers to a measure of texture of a surface which is quantified by vertical deviations of the surface from its standard. For example, in the context of a glass-ceramic article, the target roughness value may be from about 10 RMS (nm) to about 1000 RMS (nm), or from about 10 RMS (nm) to about 800 RMS (nm), or from about 25 RMS (nm) to about 800 RMS (nm), or from about 150 RMS (nm) to about 800 RMS (nm), or from about 25 RMS (nm) to about 600 RMS (nm), or from about 50 RMS (nm) to about 700 RMS (nm), or from about 100 RMS (nm) to about 600 RMS (nm), or from about 150 RMS (nm) to about 200 RMS (nm), or from about 200 RMS (nm) to about 400 RMS (nm), or from about 300 RMS (nm) to about 350 RMS (nm). In one embodiment, the roughened surface has a target roughness value of from about 25 rms (nm) to about 800 rms (nm).

The reduced gloss value and the target roughness value (i.e. surface roughness) may be directly related to the depth of the surface being removed (i.e., depth of removal). For example, the ability to control the depth of removal (hereinafter "DOR") may result in specific reduced gloss values and/or specific target roughness values. In one particular example, a higher DOR may result in a lower reduced gloss value and a higher target roughness value. Examples of parameters to be considered in controlling DOR and the resulting reduced gloss values and/or target roughness values include: 1) chemical etching solution type and concentration thereof; 2) etching time; 3) temperature; and 4) agitation. With specific regard to agitation, agitation such as ultrasound, vertical agitation, and gas bubbling refresh the surface of the glass-ceramic article part during etching which may influence the etch rate and the uniformity of the post-etch surface.

Examples of particular chemical etching solutions suitable for glass-ceramic articles having a major crystalline phase or a major amorphous phase include chemical etching solutions formed by mixing hydrofluoric acid, ammonium fluoride, and a mineral acid. In one particular embodiment, the chemical etching solution includes from about 0.5% (w/w) to about 6% (w/w) hydrofluoric acid, from about 10% (w/w) to about 25% (w/w) ammonium fluoride, and from about 0.5 M to about 1 M sulfuric acid. Additional examples of particular chemical etching solutions suitable for glass-ceramic articles having a major crystalline phase or a major amorphous phase include chemical etching solutions wherein BHF functions as a mixture of hydrofluoric acid and an inorganic fluoride salt. For example, in one particular embodiment, the chemical etching solution includes from about 5% (w/w) to about 30% (w/w) ammonium fluoride and from about 1% (w/w) to about 6% (w/w) hydrofluoric acid.

Another example of particular chemical etching solutions suitable for glass-ceramic articles having a major crystalline phase or a major amorphous phase include chemical etching solutions wherein ABF functions as a mixture of hydrofluoric acid and an inorganic fluoride salt. For example, in one particular embodiment, the chemical etching solution includes from about 5% (w/w) to about 25% (w/w), or alternatively from about 10% (w/w) to about 20% (w/w) of ABF. In further embodiments, the chemical etching solution includes from about 5% (w/w) to about 25% (w/w) of ABF and from about 5% (w/w) to about 25% (w/w) of a wetting agent. Such chemical etching solutions may be applied to the non-damaged surface of the glass-ceramic article for an etching time of from about 1 min to about 4 min to modify the non-damaged surface of the glass-ceramic article to form a roughened surface having a reduced gloss value of from about 0.1% to about 30% at 60°.

In still further embodiments, the chemical etching solution includes from about 5% (w/w) to about 25% (w/w) ABF and from about 5% (w/w) to about 25% (w/w) propylene glycol. Still another example of particular chemical etching solutions suitable for glass-ceramic articles having a major crystalline phase or a major amorphous phase include chemical etching solutions formed by mixing from about 0.2% to about 10% (w/w) hydrofluoric acid and from about 1% to about 30% (w/w) ammonium fluoride. Such chemical etching solutions may modify the non-damaged surface of the glass-ceramic article to form a roughened surface having a reduced gloss value of from about 1% to about 30% at 60° and a target roughness value of from about 10 RMS (nm) to about 800 RMS (nm) such that from about 0.1 µm to about 2 µm of the depth of the glass-ceramic article is removed.

Examples of particular chemical etching solutions suitable for glass-ceramic articles having a major amorphous phase include chemical etching solutions formed by mixing hydrofluoric acid and an ammonium fluoride salt. Such chemical etching solutions may modify the non-damaged surface of the glass-ceramic article to form a roughened surface having a reduced gloss value of from about 1% to about 30% at 60° and a target roughness value of from about 150 RMS (nm) to about 800 RMS (nm) such that from about 0.1 µm to about 20 µm of the depth of the glass-ceramic article is removed.

Examples of particular chemical etching solutions suitable for glass-ceramic articles having a major crystalline phase include chemical etching solutions formed by mixing hydrofluoric acid and sulfuric acid. Such chemical etching solutions may be applied to the non-damaged surface of the glass-ceramic article for an etching time of from about 5 sec to less than about 15 min such that from about 0.1 µm to about 20 µm of the depth of the glass-ceramic article is removed. In a further particular embodiment, the chemical etching solution includes from about 0.5% (w/w) to about 6% (w/w) hydrofluoric acid and from about 0.5 M to about 1 M sulfuric acid. Such chemical etching solutions may be applied to the non-damaged surface of the glass-ceramic article to form a roughened surface having a reduced gloss value of from about 1% to about 30% at 60° and a target roughness value of from about 10 RMS (nm) to about 800 RMS (nm) such that from about 0.1 µm to about 2 µm of the depth of the glass-ceramic article is removed.

III. Removing the Chemical Etching Solution

In one embodiment, the chemical etchant is removed from the roughened surface of the glass-ceramic article at the conclusion of the etching time. A suitable example of a method for removing the chemical etching solution from the roughened surface is rinsing the roughened surface with deionized water. Deionized water functions to stop the modification of the non-damaged surface and/or the etching reaction. Alternatively, in one embodiment, a second chemical etching solution may be applied to the roughened surface of the glass-ceramic article. Suitable examples of a second chemical etching solution include mineral acids, as stated above. Such second chemical etching solution may not include hydrofluoric acid, as such acid may continue to modify and/or etch the roughened surface of the glass-ceramic article, continuing to reduce the surface roughness. The second chemical etching solution may be removed from the roughened surface by rinsing the roughened surface with deionized water.

In a further embodiment, a glass-ceramic article formed by the methods described herein is disclosed. The glass-ceramic article may be opaque, colored, or translucent.

EXAMPLES

The embodiments described herein will be further clarified by the following examples.

Example 1

Relationship Between Gloss Value and DOR for a White Glass-Ceramic Article Having a Major Crystalline Phase Experimental Protocol.

The relationship between gloss value at 60° and DOR for white glass-ceramic articles having a major crystalline phase was studied. Generally, a chemical etching solution was applied to a non-damaged surface of a glass-ceramic article having a major crystalline phase for a period of 1-16 minutes. More particularly, a chemical etching solution of 0.8%-2.5% (wt/wt) HF and 5% (wt/wt) $H_2SO_4$ was applied to a non-damaged surface of a white glass-ceramic article having about 90% by volume crystallinity, specifically having a major spodumene crystalline phase and a minor rutile crystalline phase. Such white glass-ceramic article was as previously described with regard to a simple sodium alumino silicate glass with the following batched composition, in weight percent: 58.8% $SiO_2$, 21.5% $Al_2O_3$, 13.6% $Na_2O$, 0.3% $SnO_2$, and 4.3% $TiO_2$.

Gloss values were determined, such as in accordance with ASTM procedure D523. DOR was determined via: (1) protecting (i.e., taping) about half of the non-damaged surface of the glass-ceramic article with plastic tape (3M, St. Paul Minn.); (2) dipping the glass-ceramic article into the etching solution for a period of 1-16 minutes as described above; (3) removing the plastic tape (wherein the protected half of the non-damaged surface of the glass-ceramic article is thicker than the unprotected half); and (4) measuring the DOR (i.e., step height) with a Surfcom 2000 SD (Carl Zeiss Industrial Metrology, LLC, Maple Grove, Minn.).

Experimental Results.

Figure 2:
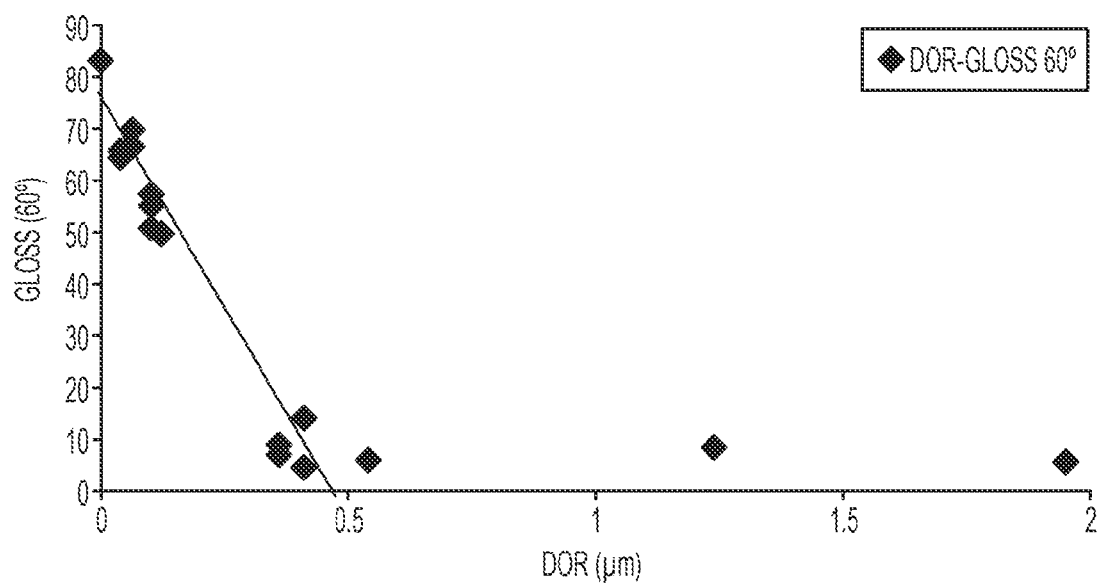
FIG. 2 is a graph of depth of removal (μm) for a glass-ceramic substrate with major crystalline phase with respect to gloss value (%) at 60°.

As shown in FIG. 2, the gloss value at 60° was directly related to DOR (and/or is controlled by DOR) for a glass-ceramic article having a major crystalline phase. The gloss value at 60° decreased linearly from about 90% to about 10% as DOR increased from about 0 to about 0.5 µm. The gloss value at 60° stabilized at 10% when the DOR value was higher than about 0.5 µm. Without being bound by the theory, such results indicate that a DOR value of 0.5 µm is sufficient to fully reveal crystal embedded in the white glass-ceramic article and that further etching will not significantly affect the gloss value at 60°.

Example 2

Appearance of White Glass-Ceramic Articles Having Different Gloss Values

Experimental Protocol.

Images were taken of glass-ceramic articles having different gloss values (90, 70, 50, 40, 30, 20, and 10) at 60°. Such gloss values were achieved by applying a chemical etching solution of 0.8%-2.5% (wt/wt) HF and 5% (wt/wt) $H_2SO_4$ to a non-damaged surface of the white glass-ceramic article having about 90% by volume crystallinity in a one-step process, as described in Example 1. Gloss values were determined, such as in accordance with ASTM procedure D523.

Experimental Results.

Figure 3:
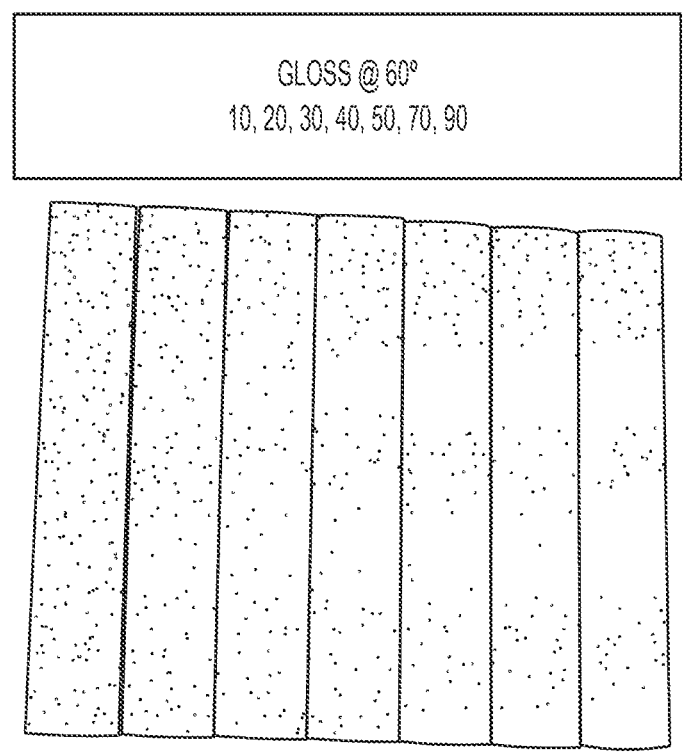
FIG. 3 is an image of a glass-ceramic substrate with a major crystalline phase varying gloss values (%) at 60° achieved by one-step etching.

Referencing FIG. 3, images of the white glass-ceramic article having about 90% by volume crystallinity are schematically shown. As shown therein, different gloss values (90, 70, 50, 40, 30, 20, 10) on the white glass-ceramic articles at 60° were achieved via one-step etching. Accordingly, gloss values at 60° may be controlled by adjusting etching conditions.

Example 3

Relationship Between Gloss Value, Hydrofluoric Acid Concentration, and Etching Time for White Glass-Ceramic Articles Having a Major Crystalline Phase Experimental Protocol.

The relationship between gloss value at 60°, concentration of a hydrofluoric acid (i.e., HF), and etching time for white glass-ceramic articles having a major crystalline phase was studied. Chemical etching solutions having hydrofluoric acid were applied to a non-damaged surface of white glass-ceramic articles having a major crystalline phase. The chemical etching solutions were prepared varying concentrations of hydrofluoric acid (1.5 M, 1 M, and 0.5 M) and sulfuric acid (0.9 M). The chemical etching solutions were then respectively applied to a non-damaged surface of white glass-ceramic articles for etching times of from 5 s to 16 min. The white glass-ceramic articles were as described in Example 1. Gloss values at 60° were determined, such as in accordance with ASTM procedure D523.

Experimental Results.

Figure 4:
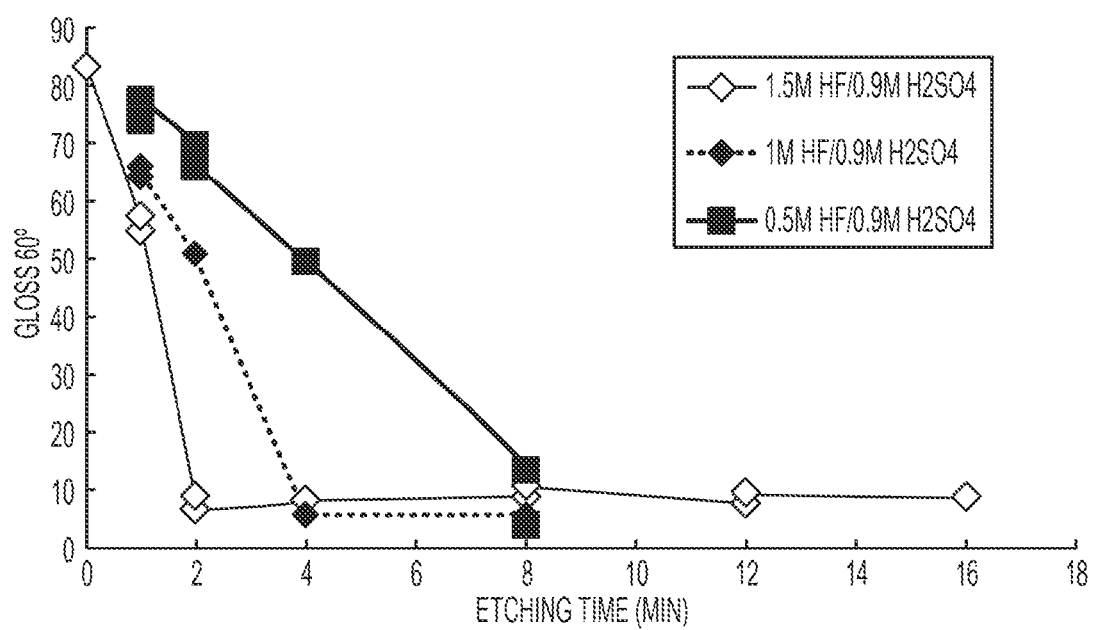
FIG. 4 is a graph of etching time (min) for a glass-ceramic substrate with a major crystalline phase with respect to gloss value (%) at 60° achieved by one-step etching with chemical etching solutions having varying concentrations of HF (1.5 M, 1 M, and 0.5 M) and $H_2SO_4$ (0.9 M)

As shown in FIG. 4, the concentration of hydrofluoric acid and etching time influenced the gloss value at 60°. More specifically, increasing concentrations of hydrofluoric acid resulted in a quick reduction of gloss value at 60°. Additionally, increasing concentrations of hydrofluoric acid resulted in increased etch rate. Additionally, with regard to chemical etching solutions having the same concentration of hydrofluoric acid, gloss values at 60° decreased linearly as the etching time increased to a steady gloss state.

Example 4

Relationship Between Gloss Value and Chemical Etching Solution Concentration

Experimental Protocol.

The relationship between gloss value at 60° and concentration of a chemical etching solution for white glass-ceramic articles having a major crystalline phase was studied. A chemical etching solution was applied to a non-damaged surface of a white glass-ceramic article having a major crystalline phase. More particularly, chemical etching solutions having varying concentration ratios of buffered hydrofluoric acid, (i.e., 1-6% by weight hydrofluoric acid and 5-30% by weight ammonium) were respectively applied to a non-damaged surface of white glass-ceramic articles for an etching time of about 8 min. The white glass-ceramic articles were as described in Example 1. Gloss values at 60° were determined, such as in accordance with ASTM procedure D523.

Experimental Results.

Figure 5:
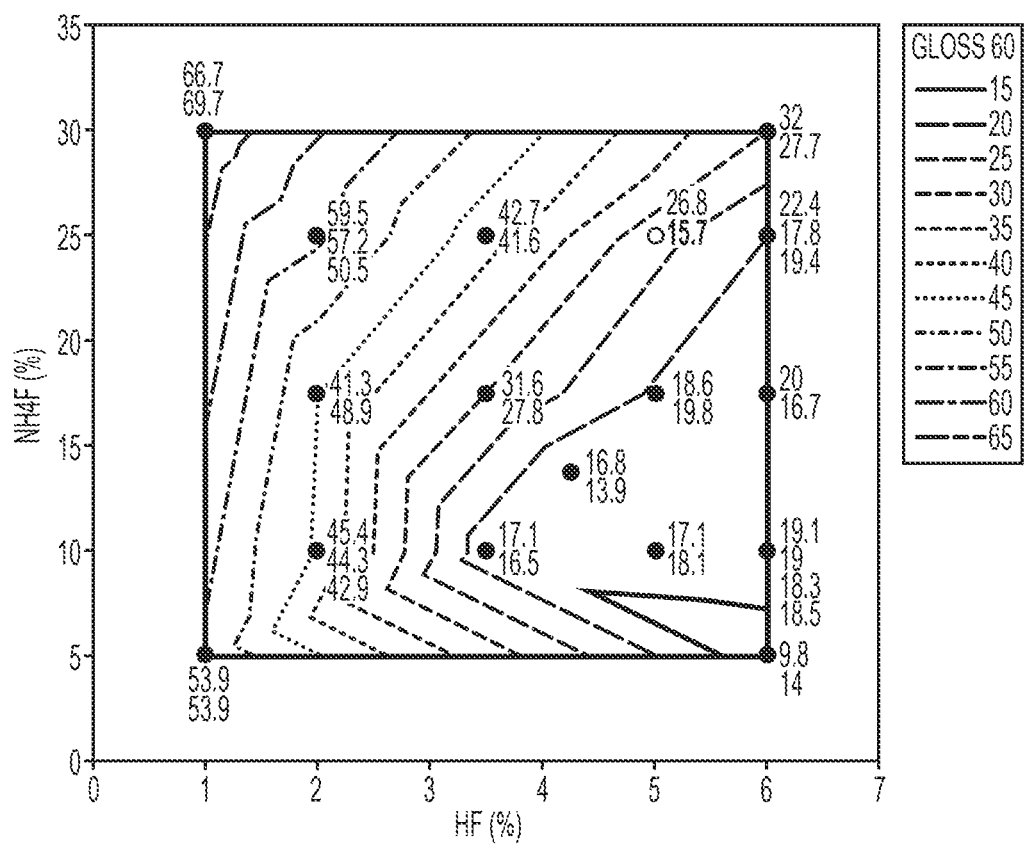
FIG. 5 is a contour plot of gloss values (%) at 60° for glass-ceramic substrates with a major crystalline phase achieved by one-step etching with chemical etching solutions having varying concentrations of HF (%) and $NH_4F$ (%)

As shown in FIG. 5, gloss values at 60° were influenced and/or controlled by the chemical makeup of the chemical etching solution and by the concentration thereof. More specifically, gloss values at 60° increased as the concentration of hydrofluoric acid decreased and the concentration of ammonium increased. In the range of hydrofluoric acid concentrations of from 1% to 6% by weight and ammonium concentrations of 5% to 30% by weight, the gloss values at 60° were precisely controlled from 70% to 10%. Such results demonstrate the feasibility of controlling gloss values at 60° using chemical etching solutions having buffered hydrofluoric acid.

Example 5

Controlling Gloss Values at 60° with Chemical Etching Solutions and Etching Time Experimental Protocol.

The relationship between gloss value at varying incident light angles and the chemical makeup of chemical etching solutions, and etching times was studied. Chemical etching solutions were applied to a non-damaged surface of white glass-ceramic articles having a major crystalline phase. More particularly, as set forth in Table 1 below, chemical etching solutions having varying concentrations of hydrofluoric acid (1% to 9% by weight) were applied to a non-damaged surface of white glass-ceramic articles for an etching time of from about 1 to about 16 min. Additionally, as set forth in Table 2 below, chemical etching solutions having varying concentration ratios of BHF, composed of from about 1% to about 6% by weight of hydrofluoric acid and from about 5% to about 30% by weight of ammonium fluoride were applied to a non-damaged surface of white glass-ceramic articles for an etching time of from about 1 to about 16 min. Finally, as set forth in Table 3 below, chemical etching solutions having varying concentrations of hydrofluoric acid (1.5 M, 1 M, and 0.5 M) and sulfuric acid (0.9 M) were applied to a non-damaged surface of white glass-ceramic articles for an etching time of about 1 min to about 16 min. The white glass-ceramic articles were as described in Example 1. Gloss values at 20°, 60°, and/or 85° were determined, such as in accordance with ASTM procedure D523.

Experimental Results.

As shown in Table 1 below, the white glass-ceramic articles were etched by the hydrofluoric acid. More particularly, the gloss value at 60° was controllable from 75% to 3%. Gloss values at 20° and 85° are also set forth in Table 1.

TABLE 1

| HF (vol %) | Time (min) | Glass-ceramics | 20° | 60° | 85° | PV (nm) | Surface Roughness (rms, nm) | Surface Roughness (Ra) |
|---|---|---|---|---|---|---|---|---|
| 0 |  | white | 100.1 | 89.1 | 44.6 |  |  |  |
| 1 | 3 | white | 74.7 | 76.7 | 78.3 | 49.8 | 4.6 | 3.6 |
| 1 | 6 | white | 60.2 | 68.5 | 76.8 |  |  |  |
| 2 | 3 | white | 50.7 | 67.2 | 75.8 |  |  |  |
| 2 | 3 | white |  | 67.5 |  |  |  |  |
| 2 | 6 | white | 24.5 | 43.5 | 75.7 |  |  |  |
| 3 | 3 | white | 35.5 | 53.6 | 72.4 | 130.9 | 7.5 | 5.9 |
| 3 | 3 | white | 29.3 | 45.2 | 72.5 | 99.1 | 7.2 | 5.6 |
| 3 | 3 | white |  | 55 |  |  |  |  |
| 3 | 6 | white | 5.8 | 25.9 | 62.1 | 4982 | 340.8 | 261.6 |
| 3 | 6 | white | 9.8 | 32.2 | 69.8 | 3994 | 355 | 276 |
| 4 | 3 | white | 18.1 | 42.4 | 72.5 |  |  |  |
| 4 | 3 | white | 21.9 | 45.7 | 61.7 |  |  |  |
| 4 | 5 | white |  | 16 |  |  |  |  |
| 4 | 6 | white | 1.2 | 11.4 | 43.6 | 5069 | 298.9 | 228.2 |
| 4 | 6 | white | 1.4 | 15 | 52.9 |  |  |  |
| 4 | 6 | white |  | 11.5 |  |  |  |  |
| 4 | 6 | white |  | 5.1 |  |  |  |  |
| 4 | 6 | white |  | 18 |  |  |  |  |
| 6 | 3 | white |  | 21.3 |  |  |  |  |
| 6 | 6 | white | 1.2 | 4.1 | 12.7 | 4803 | 351 | 267 |
| 6 | 12 | white | 1.5 | 4.4 | 20.6 |  |  |  |
| 9 | 3 | white |  | 10.4 |  |  |  |  |
| 9 | 6 | white | 1.2 | 3.3 | 18.2 |  |  |  |

As shown in Table 2 below, the white glass-ceramic articles were etched by buffered hydrofluoric acid. More particularly, the gloss value at 60° was controllable.

TABLE 2

| White Ceramics-part No. | HF (%) | NH$_4$F (%) | Gloss 60 (degree) |
|---|---|---|---|
| 1 | 6 | 30 | 27.7 |
| 2 | 6 | 30 | 32 |
| 3 | 1 | 30 | 66.7 |
| 4 | 1 | 30 | 69.7 |
| 5 | 6 | 5 | 14 |
| 6 | 6 | 5 | 9.8 |
| 7 | 1 | 5 | 53.9 |
| 8 | 1 | 5 | 53.9 |
| 9 | 2 | 10 | 45.4 |
| 10 | 2 | 10 | 44.3 |
| 11 | 3.5 | 10 | 17.1 |
| 12 | 3.5 | 10 | 16.5 |
| 13 | 5 | 10 | 17.1 |
| 14 | 5 | 10 | 18.1 |
| 15 | 6 | 10 | 19 |
| 16 | 6 | 10 | 19.1 |
| 17 | 2 | 17.5 | 48.9 |
| 18 | 2 | 17.5 | 41.3 |
| 19 | 3.5 | 17.5 | 27.8 |
| 20 | 3.5 | 17.5 | 31.6 |
| 21 | 5 | 17.5 | 19.8 |
| 22 | 5 | 17.5 | 18.6 |
| 23 | 6 | 17.5 | 10.7 |
| 24 | 6 | 17.5 | 10.5 |
| 25 | 2 | 25 | 50.5 |
| 26 | 2 | 25 | 57.2 |
| 27 | 3.5 | 25 | 41.6 |
| 28 | 3.5 | 25 | 42.7 |
| 29 | 5 | 25 | 26.8 |
| 30 | 5 | 25 | 15.7 |
| 31 | 6 | 25 | 19.4 |
| 32 | 6 | 25 | 22.4 |
| 33 | 4.25 | 13.75 | 13.9 |
| 34 | 4.25 | 13.75 | 16.8 |
| 35 | 6 | 17.5 | 20 |
| 36 | 6 | 17.5 | 16.7 |
| 37 | 6 | 10 | 18.3 |
| 38 | 6 | 10 | 18.5 |
| 39 | 6 | 10 | 9.9 |
| 40 | 2 | 25 | 59.5 |
| 41 | 2 | 10 | 42.9 |
| 42 | 6 | 25 | 17.8 |

As shown in Table 3 below, the white glass-ceramic articles were etched by hydrofluoric acid and sulfuric acid. hydrofluoric acid. More particularly, the gloss value at 60° was controllable.

TABLE 3

| Sample | HF (M) | H$_2$SO$_4$ (M) | Time (min) | Gloss 60 | DOR (um) |
|---|---|---|---|---|---|
| 1 | 0 | 0 | 0 | 83.4 | 0 |
| 2 | 1.5 | 0.9 | 1 | 57.4 | 0.1 |
| 3 | 1.5 | 0.9 | 1 | 54.9 | 0.1 |
| 4 | 1.5 | 0.9 | 2 | 9.1 | 0.36 |
| 5 | 1.5 | 0.9 | 2 | 7 | 0.36 |
| 6 | 1.5 | 0.9 | 4 | 8.2 | 1.24 |
| 7 | 1.5 | 0.9 | 4 | 8.8 | 1.24 |
| 8 | 1.5 | 0.9 | 8 | 9.1 | 3.45 |
| 9 | 1.5 | 0.9 | 8 | 10.9 | 3.45 |

TABLE 3-continued

| Sample | HF (M) | H$_2$SO$_4$ (M) | Time (min) | Gloss 60 | DOR (um) |
|---|---|---|---|---|---|
| 10 | 1.5 | 0.9 | 12 | 8.1 | 5.3 |
| 11 | 1.5 | 0.9 | 12 | 9.6 | 5.3 |
| 12 | 1.5 | 0.9 | 16 | 9.1 | 7 |
| 13 | 1 | 0.9 | 1 | 65.8 | 0.04 |
| 14 | 1 | 0.9 | 1 | 64.5 | 0.04 |
| 15 | 1 | 0.9 | 2 | 50.6 | 0.1 |
| 16 | 1 | 0.9 | 2 | 51.1 | 0.1 |
| 17 | 1 | 0.9 | 4 | 5.7 | 0.54 |
| 18 | 1 | 0.9 | 4 | 6.1 | 0.54 |
| 19 | 1 | 0.9 | 8 | 6 | 1.95 |
| 20 | 1 | 0.9 | 8 | 5.5 | 1.95 |
| 21 | 0.5 | 0.9 | 1 | 74.4 | |
| 22 | 0.5 | 0.9 | 1 | 77.5 | |
| 23 | 0.5 | 0.9 | 2 | 69.9 | 0.06 |
| 24 | 0.5 | 0.9 | 2 | 66.2 | 0.06 |
| 25 | 0.5 | 0.9 | 4 | 49.5 | 0.12 |
| 26 | 0.5 | 0.9 | 4 | 50 | 0.12 |
| 27 | 0.5 | 0.9 | 8 | 14 | 0.41 |
| 28 | 0.5 | 0.9 | 8 | 4.4 | 0.41 |

Example 6

Relationship Between Gloss Value, Chemical Etching Solution Concentration, and Etching Time for a Black Glass-Ceramic Article Having a Major Amorphous Phase Experimental Protocol.

The relationship between gloss value at 60°, chemical etching solution concentrations, and etching time for black glass-ceramic articles having a major amorphous phase was studied. A chemical etching solution was applied to a non-damaged surface of a black glass-ceramic article having a major amorphous phase. More particularly, a chemical etching solution having varying concentrations of ammonium bifluoride (10% or 15% by weight) and propylene glycol (10% by weight) was applied to a non-damaged surface of a black glass-ceramic article having about 95% by volume amorphous phase for etching times of about 15 s to about 5 min. Such black glass-ceramic article was Corning® Gorilla® Glass (Corning Incorporated) with color additive to obtain the black color. After applying the chemical etching solution for the appropriate etching time, the black glass-ceramic articles were soaked in sulfuric acid (1 M) for about 5 min to remove crystals formed in the previous steps. Gloss values at 60° were determined, such as in accordance with ASTM procedure D523.

Experimental Results.

Figure 6:
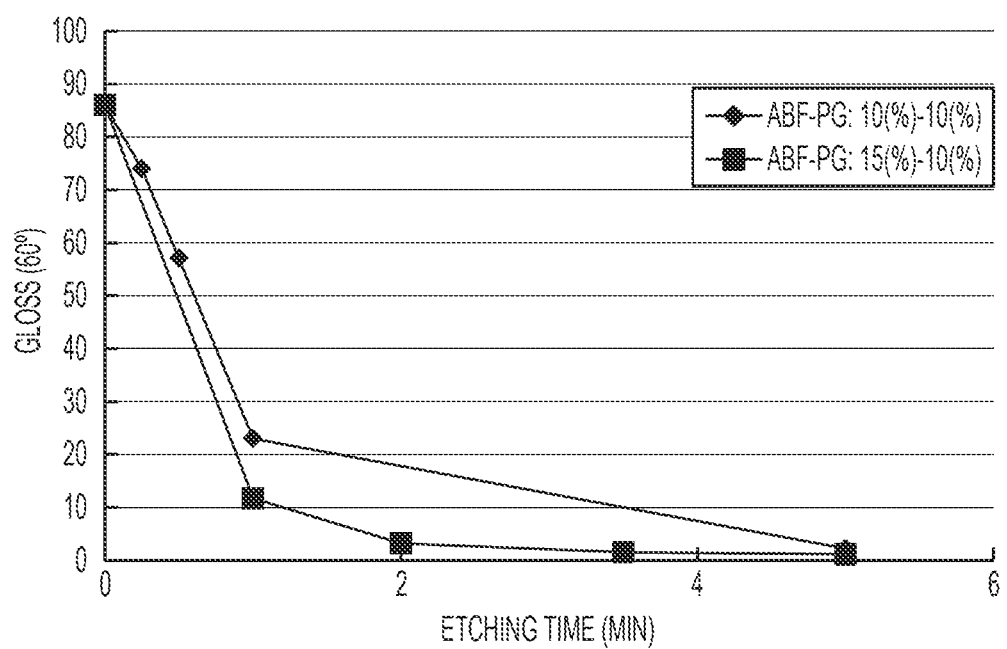
FIG. 6 is a graph of etching time (min) for a glass-ceramic substrate having a major amorphous phase with respect to gloss value (%) at 60° achieved by one-step etching with chemical etching solutions having varying concentrations of Ammonium Bifluoride (10%, 15%) and Propylene Glycol (10%)

As shown in FIG. 6, gloss values at 60° can easily be modified by varying the concentration of the chemical etching solution, particularly the concentration of ammonium bifluoride, and by varying the etching time. While the gloss value at 60° of an untreated surface of black glass-ceramic articles is about 86%, upon applying a chemical etching solution having 10% by weight ammonium bifluoride and 10% by weight propylene glycol, the gloss value at 60° reduced to 1% with an etching time of 5 min. Similar trends held for the application of chemical etching solutions having 15% by weight ammonium bifluoride and 10% by weight propylene glycol, however, the etch rate increased. Such data indicate that gloss values at 60° can be easily controlled by varying the concentrations of the chemical etching solutions and by varying etching times. Moreover, the resulting etched black glass-ceramic articles exhibited good surface uniformity.

Example 7

Relationship Between Gloss Value and Chemical Etching Solution Concentration for a Black Glass-Ceramic Article Having a Major Amorphous Phase Experimental Protocol.

The relationship between gloss value at 60° and concentration of chemical etching solutions for black glass-ceramic articles having a major crystalline phase was studied. Chemical etching solutions were applied to a non-damaged surface of a black glass-ceramic article having a major amorphous phase for a period of about 8 minutes. More particularly, chemical etching solutions having varying concentration ratios of buffered hydrofluoric acid, (i.e., 2-6% by weight hydrofluoric acid and 10-25% by weight ammonium fluoride) were respectively applied to a non-damaged surface of black glass-ceramic articles for an etching time of about 8 min. The black glass-ceramic articles were as described in Example 6. Gloss values at 60° were determined, such as in accordance with ASTM procedure D523.

Experimental Results.

Figure 7:
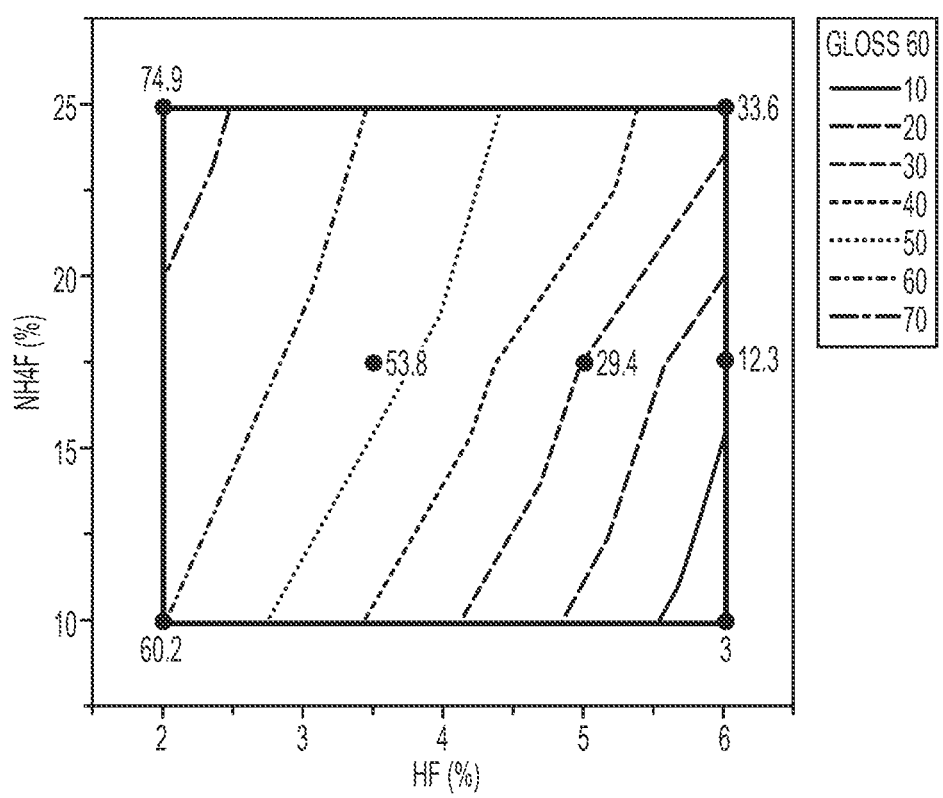
FIG. 7 is a contour plot of gloss values (%) at 60° for glass-ceramic substrates with a major amorphous phase achieved by one-step etching with chemical etching solutions having varying concentrations of HF (%) and $NH_4F$ (%)

As shown in FIG. 7, gloss values at 60°, gloss values were influenced and/or controlled by the chemical makeup of the chemical etching solution and by the concentration thereof. More specifically, gloss values at 60° decreased as the concentration of hydrofluoric acid increases. Additionally, gloss values at 60° increased as the concentration of ammonium increased. Such results demonstrate the feasibility of controlling gloss values at 60° using chemical etching solutions having buffered hydrofluoric acid.

Example 8

Relationship Between Gloss Value and DOR for a Black Glass-Ceramic Article Having a Major Amorphous Phase Experimental Protocol.

The relationship between gloss value at 60° and DOR for black glass-ceramic articles having a major amorphous phase was studied. A chemical etching solution was applied to a non-damaged surface of a glass-ceramic article having a major amorphous phase for a period of 1-5 minutes. More particularly, a chemical etching solution of 15%-25% (wt/wt) ABF and 10%-15% (wt/wt) propylene glycol was applied to a non-damaged surface of a black glass-ceramic article as described in Example 6.

Gloss values were determined, such as in accordance with ASTM procedure D523. DOR was determined via: (1) protecting (i.e., taping) about half of the non-damaged surface of the glass-ceramic article with plastic tape (3M, St. Paul Minn.); (2) dipping the glass-ceramic article into the etching solution for a period of 1-16 minutes as described above; (3) removing the plastic tape (wherein the protected half of the non-damaged surface of the glass-ceramic article is thicker than the unprotected half); and (4) measuring the DOR (i.e., step height) with a Surfcom 2000 SD (Carl Zeiss Industrial Metrology, LLC).

Experimental Results.

Figure 8:
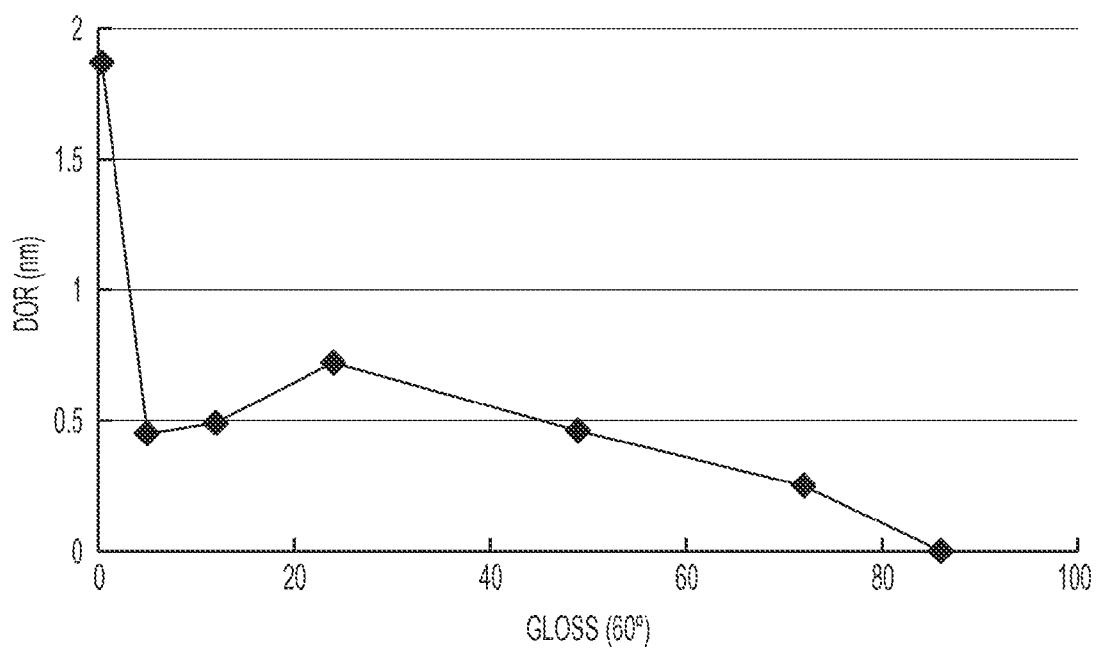
FIG. 8 is graph of gloss values (%) at 60° for glass-ceramic substrates with a major amorphous phase achieved by one-step etching with chemical etching solutions with respect to depth of removal (nm)

As shown in FIG. 8, the material loss from such etching was low. More particularly, for a gloss value at 60° of 0.4%, only 1.9 µm was removed from the black glass-ceramic article. For alternative conditions, the material loss was less than 1 µm. Such data suggests that the methods employed herein are effective for modifying the non-damaged surface of the black glass-ceramic article. Moreover, minimal material loss indicates that acid consumption is very small.

Example 9

Relationship Between Gloss Value and Surface Roughness RMS for a Black Glass-Ceramic Article Having a Major Amorphous Phase Experimental Protocol.

The relationship between gloss value at 60° and surface roughness RMS (nm) for black glass-ceramic articles having a major amorphous phase was studied. A chemical etching solution was applied to a non-damaged surface of a glass-ceramic article having a major amorphous phase for a period of 1-5 minutes. More particularly, a chemical etching solution of 15%-25% (wt/wt) ABF and 10%-15% (wt/wt) propylene glycol was applied to a non-damaged surface of a black glass-ceramic article as described in Example 6. Gloss values were determined, such as in accordance with ASTM procedure D523. Surface roughness was determined with a Newview™ 7300 (Zygo Corporation, Middlefield, Conn.).

Experimental Results.

Figure 9:
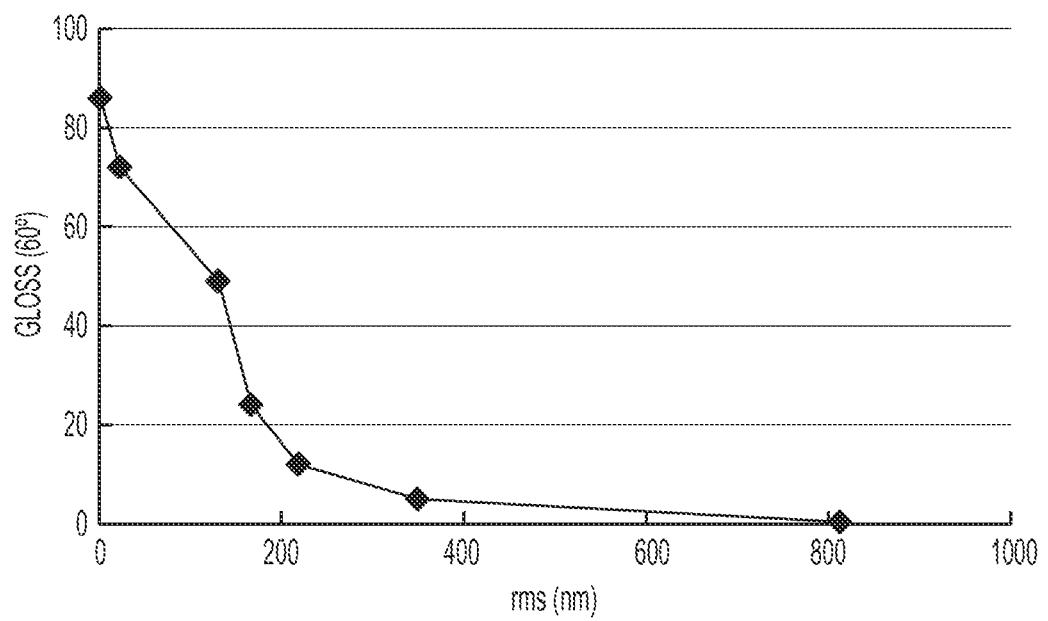
FIG. 9 is a graph of roughness rms (nm) for glass-ceramic substrates with a major amorphous phase achieved by one-step etching with chemical etching solutions with respect to gloss value (%) at 60°.

As shown in FIG. 9, a correlation existed between gloss values at 60° and surface roughness RMS (nm) with the black glass-ceramic articles. Generally, surface roughness lead to a reduction in the gloss value of the surface. Gloss values at 60° decreased with increasing surface roughness. More particularly, gloss values at 60° decreased rapidly with increasing surface roughness for high gloss surfaces. Additionally, it was also discovered that surfaces of the black glass-ceramic articles having a low gloss value (less than 20%, or less than 10% at 60°) provided a pleasant tactile feeling upon touch. Accordingly, surfaces having a surface roughness (rms) of greater than 150 nm may be useful for tactile applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Whenever a group is described as comprising and/or including at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other.

What is claimed is:

1. A method of modifying a non-damaged surface of a glass-ceramic article, the method comprising:
    a) providing a glass-ceramic article having a non-damaged surface and an initial gloss value;
    b) applying a chemical etching solution to the non-damaged surface of the glass-ceramic article for an etching time of about 5 s to less than 15 min to form a roughened surface, remove from about 0.01 μm to about 20 μm of depth of the glass-ceramic article and reduce the initial gloss value to a reduced gloss value from about 10% to 70% at 60°, wherein the chemical etching solution is formed by mixing hydrofluoric acid and an inorganic fluoride salt, the concentration of hydrofluoric acid is from 1% to 6% by weight of the etching solution and the inorganic fluoride salt is 5% to 30% by weight of the etching solution; and
    c) removing the chemical etching solution from the roughened surface.

2. The method of claim 1, wherein the inorganic fluoride salt is selected from the group consisting of ammonium fluoride, ammonium bifluoride, buffered hydrofluoric acid, sodium fluoride, sodium bifluoride, potassium fluoride, potassium bifluoride, and combinations thereof.

3. The method of claim 1, wherein the chemical etching solution further comprises a mineral acid selected from the group consisting of hydrochloric acid, nitric acid, phosphoric acid, sulfuric acid, boric acid, hydrofluoric acid, hydrobromic acid, perchloric acid, and combinations thereof and optionally further comprises an organic acid.

4. The method of claim 1, wherein the chemical etching solution further comprises a wetting agent selected from the group consisting of glycols, glycerols, alcohols, surfactants, and combinations thereof.

5. The method of claim 1, wherein the chemical etching solution further comprises a thickening agent.

6. The method of claim 1, wherein the etching time is from about 1 min to about 8 min.

7. The method of claim 1, wherein the chemical etching solution modifies the non-damaged surface such that from about 0.25 μm to about 1 μm of the depth of the glass-ceramic article is removed.

8. The method of claim 1, wherein the reduced gloss value is from about 10% to about 60% at 60°, and wherein the chemical etching solution is applied to the non-damaged surface after the glass-ceramic article is subjected to ion exchange.

9. The method of claim 1, wherein the reduced gloss value is from about 10% to about 30% at 60°.

10. The method of claim 1, wherein the surface is roughened to a target roughness value from about 10 RMS (nm) to about 1000 RMS (nm), and wherein formation of the roughened surface having the reduced gloss value and the target roughness value preserves and/or improves surface strength of the glass-ceramic article.

11. The method of claim 10, wherein the target roughness value is from about 150 RMS (nm) to about 800 RMS (nm).

12. The method of claim 1, wherein the glass-ceramic article comprises a major crystalline phase.

13. The method of claim 12, wherein the reduced gloss value is from about 10% to about 30% at 60°; and the chemical etching solution modifies the non-damaged surface such that from about 0.1 μm to about 2 μm of the depth of the glass-ceramic article is removed.

14. The method of claim 1, wherein the glass-ceramic article comprises a major amorphous phase.

15. The method of claim 14, wherein: the chemical etching solution comprises from about 5% to about 25% ammonium bifluoride as the mixture of hydrofluoric acid and the inorganic fluoride salt; the chemical etching solution further comprises from about 5% to about 25% of a wetting agent; the reduced gloss value is from about 10% to about 30% at 60°; and the etching time is from about 1 min to about 4 min.

16. A method of modifying a non-damaged surface of a glass-ceramic article having a major amorphous phase, the method comprising:
   a) providing a glass-ceramic article having a non-damaged surface and an initial gloss value;
   b) applying a chemical etching solution to the non-damaged surface of the glass-ceramic article for an etching time of about 5 s to less than 15 min to form a roughened surface having a target roughness value of from about 150 RMS (nm) to about 800 RMS (nm), remove from about 0.01 μm to about 20 μm of depth of the glass-ceramic article and reduce the initial gloss value to a reduced gloss value from about 10% to 30% at 60°, wherein the chemical etching solution is formed by mixing hydrofluoric acid and an ammonium fluoride salt, the concentration of hydrofluoric acid is from 1% to 6% by weight of the etching solution and the ammonium fluoride salt is 5% to 30% by weight of the etching solution; and
   c) removing the chemical etching solution from the roughened surface.

17. A method of modifying a non-damaged surface of a glass-ceramic article having a major crystalline phase, the method comprising:
   a) providing a glass-ceramic article having a non-damaged surface and an initial gloss value;
   b) applying a chemical etching solution to the non-damaged surface of the glass-ceramic article for an etching time of about 5 s to less than 15 min to form a roughened surface having a target roughness value, remove from about 0.01 μm to about 20 μm of depth of the glass-ceramic article and reduce the initial gloss value to a reduced gloss value, wherein the chemical etching solution comprises hydrofluoric acid and an inorganic fluoride salt, the concentration of hydrofluoric acid is from 1% to 6% by weight of the etching solution and the inorganic fluoride salt is 5% to 30% by weight of the etching solution; and
   c) removing the chemical etching solution from the roughened surface.

18. The method of claim 17, wherein: the chemical etching solution further comprises from about 0.05 M to about 6 M of a mineral acid; and the reduced gloss value is from about 0.1% to about 30% at 60°; the target roughness value is from about 10 RMS (nm) to about 800 RMS (nm).

* * * * *